(12) United States Patent
Kim et al.

(10) Patent No.: US 6,808,097 B2
(45) Date of Patent: Oct. 26, 2004

(54) PIVOT DOWN CONTAINER HOLDER AND TRAY COMBINATION

(75) Inventors: Kwang-Ha Kim, Holland, MI (US); Raymond A. Iavasile, Holland, MI (US); Michael D. Luyckx, Grand Rapids, MI (US); Jeffrey L. Barber, Zeeland, MI (US)

(73) Assignee: Johnson Controls Technology, Plymouth, MI (US)

( * ) Notice: Subject to any disclaimer, the term of this patent is extended or adjusted under 35 U.S.C. 154(b) by 153 days.

(21) Appl. No.: 10/100,783

(22) Filed: Mar. 19, 2002

(65) Prior Publication Data

US 2002/0134807 A1 Sep. 26, 2002

Related U.S. Application Data

(60) Provisional application No. 60/278,306, filed on Mar. 23, 2001.

(51) Int. Cl.[7] .................................................. B60R 7/06
(52) U.S. Cl. ..................... 224/483; 224/282; 224/926; 248/311.2
(58) Field of Search ................................. 224/282, 483, 224/926; 280/727; 296/37.12, 37.13, 37.15, 37.8; 248/311.2

(56) References Cited

U.S. PATENT DOCUMENTS

| | | | |
|---|---|---|---|
| 245,694 A | 6/1881 | Tihovici | |
| 4,792,184 A | 12/1988 | Lindberg et al. | |
| 4,882,807 A | 11/1989 | Frye et al. | |
| 5,018,633 A | 5/1991 | Toth et al. | |
| 5,060,899 A | * 10/1991 | Lorence et al. | 224/483 |
| 5,342,009 A | 8/1994 | Lehner | |
| 5,489,054 A | * 2/1996 | Schiff | 224/926 |
| 5,692,658 A | * 12/1997 | Fischer et al. | 224/282 |
| 6,085,953 A | * 7/2000 | Bober et al. | 224/483 |
| 6,361,008 B1 | * 3/2002 | Gravenstreter | 224/926 |
| 6,513,687 B1 | * 2/2003 | Siniarski | 224/282 |

FOREIGN PATENT DOCUMENTS

| DE | 443562 | 12/1925 | |
|---|---|---|---|
| JP | 4-50037 A | * 2/1992 | 224/282 |

* cited by examiner

Primary Examiner—Gary E. Elkins
(74) Attorney, Agent, or Firm—Price, Heneveld, Cooper, DeWitt & Litton, LLP

(57) ABSTRACT

A container holder/tray combination includes a housing for mounting to a vehicle. The housing defines a recess for receiving therein at least one container holder, a cover pivotally mounted to the housing for covering the container holder and housing when in a closed position, and movable to an open position. The cover has a surface defining a tray, and the container holder is movably mounted with respect to the housing and tray between a first position coplanar with the tray for positioning a container therein and a second position within the housing. In a preferred embodiment, multiple independently movable adjacent container holders are provided to allow selectable use of the tray area.

15 Claims, 6 Drawing Sheets

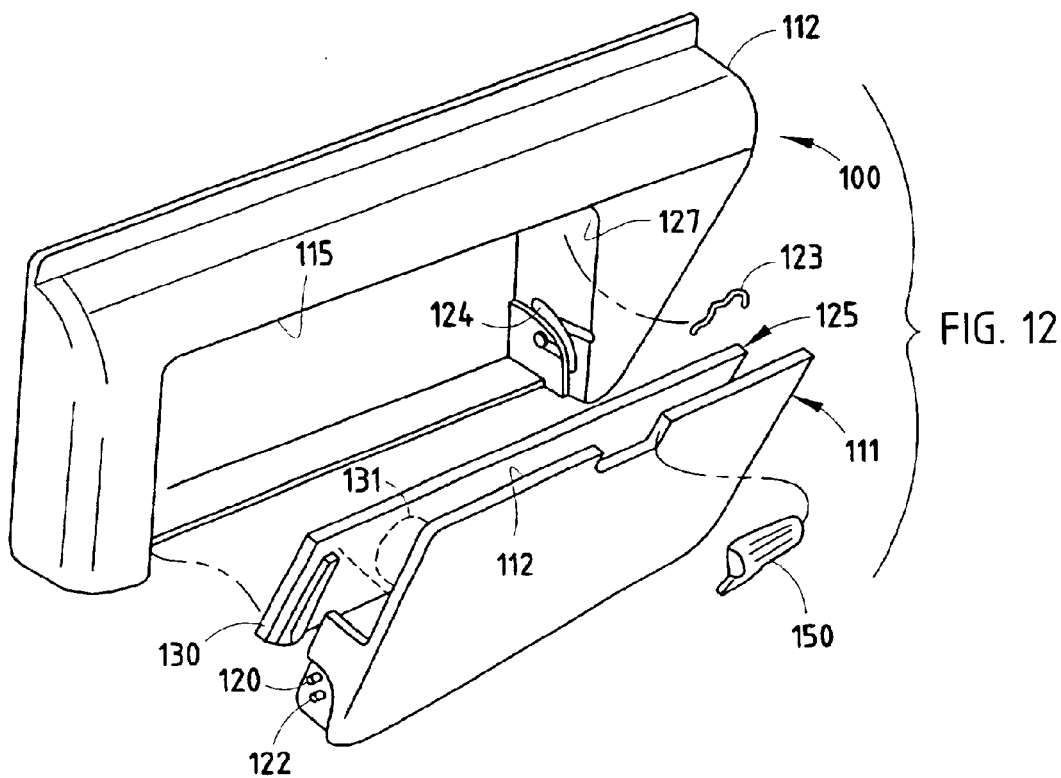
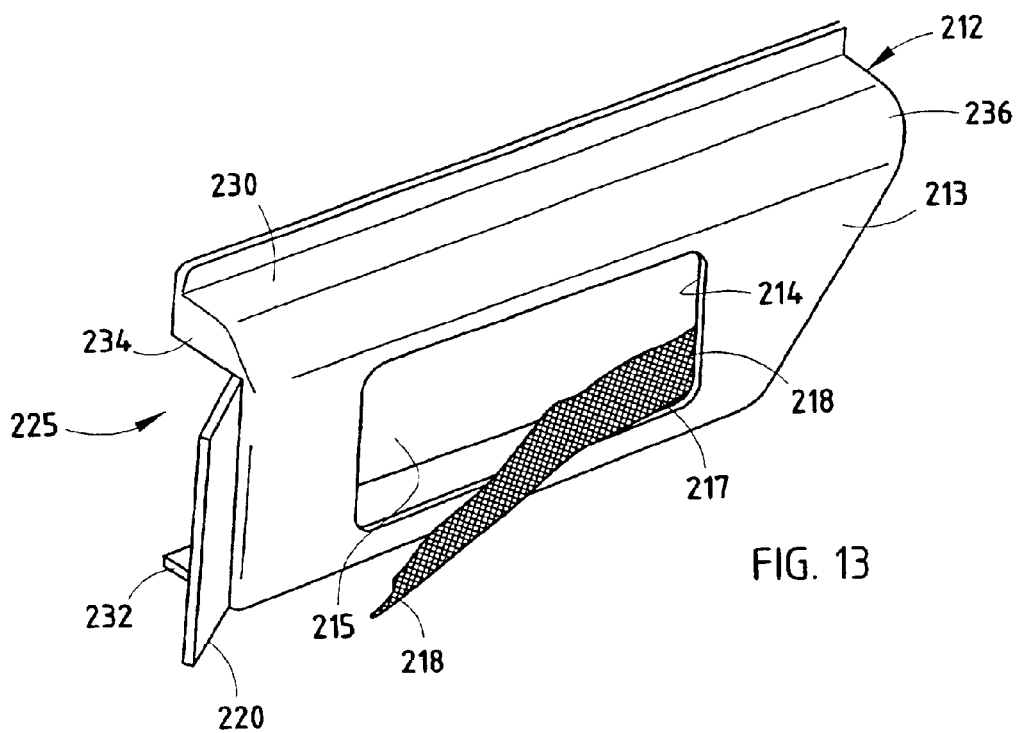

PIVOT DOWN CONTAINER HOLDER AND TRAY COMBINATION

CROSS-REFERENCE TO RELATED APPLICATIONS

This application claims priority under 35 U.S.C. § 119(e) on U.S. Provisional Application No. 60/278,306 entitled PIVOT DOWN CONTAINER HOLDER AND TRAY COMBINATION, filed on Mar. 23, 2001, by Kwang-Ha Kim et al., the entire disclosure of which is incorporated herein by reference.

BACKGROUND OF THE INVENTION

The present invention relates to vehicle accessories and particularly a pivot down tray/container holder combination.

There exists numerous vehicle storage compartments, such as center consoles located between front seats of a vehicle with covers that can be opened for storage of items therein. Further, such consoles frequently include container holders which can be extended for use as, for example, shown in U.S. Pat. No. 4,792,184. Some proposals have included both container holders and storage trays independently as shown, for example, in U.S. Pat. No. 5,018,633. Although these and other various compact container and storage compartments provide essential storage for a variety of items including containers, there remains a need for a compact and flexible storage system which allows for the holding of items in a readily accessible position as well as providing one or more container holders which can be selectively moved to provide temporary storage of items other than cylindrical containers. This invention addresses the remaining need for a flexible, compact storage system for vehicles.

SUMMARY OF THE INVENTION

A container holder/tray combination comprises a housing for mounting to a vehicle, which housing defines a recess for receiving at least one container holder. A cover is pivotally mounted to the housing for covering the container holder and housing recess when in a closed position. When the cover is moved to a first open position, it presents a surface defining a tray. At least one container holder is movably positioned with respect to the housing and tray between a first position coplanar with the tray for holding a container and a second position within the housing exposing the tray. The tray, in one embodiment, includes an area adjacent the container holder serving as a support surface for items. In a preferred embodiment, multiple container holders, which are independently movable, are provided. The resultant structure provides a high degree of flexibility for storage of drink and food containers and other items.

These and other features, objects and advantages of the present invention will become apparent upon reading the following description thereof together with reference to the accompanying drawings.

BRIEF DESCRIPTION OF THE DRAWINGS

FIG. 12 is an exploded perspective view of an alternative embodiment of the invention; and FIG. 13 is a perspective view of yet another embodiment of the present invention.

DETAILED DESCRIPTION OF THE PREFERRED EMBODIMENT

Figure 1:
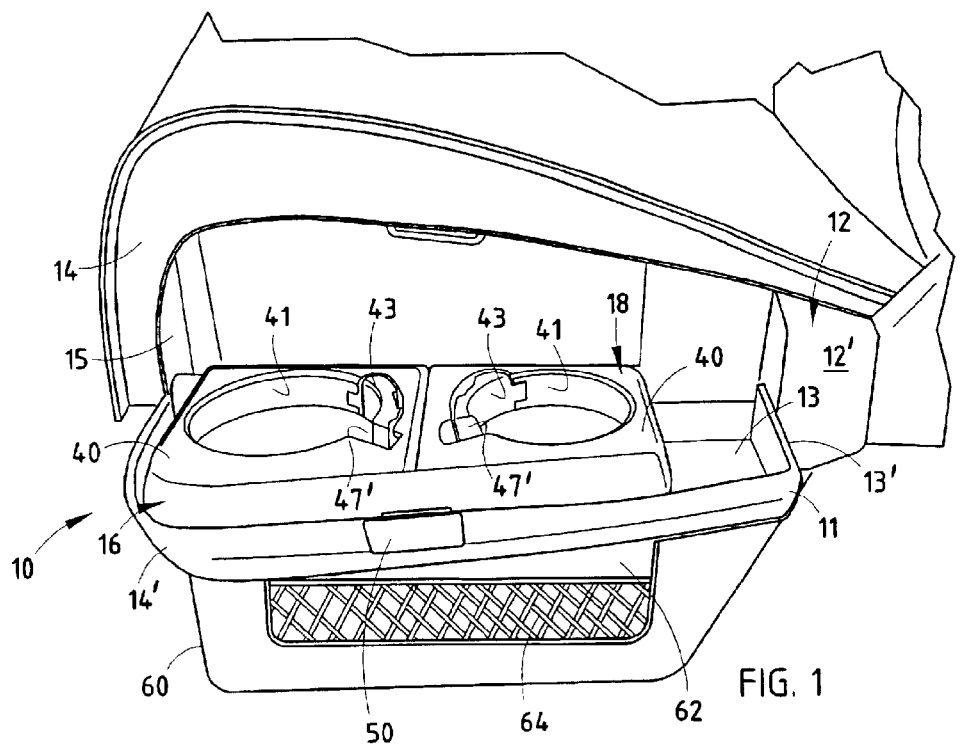
FIG. 1 is a fragmentary perspective view of a vehicle having one embodiment of the invention installed therein.
Figure 2:
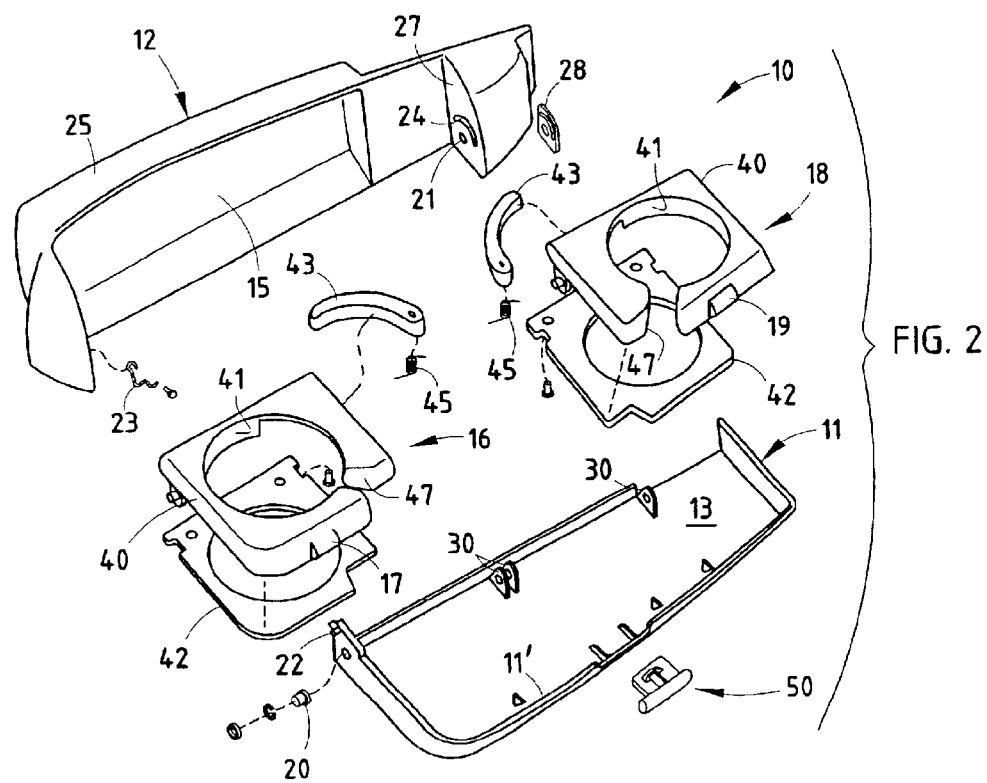
FIG. 2 is an exploded perspective view of the present invention.
Figure 3:
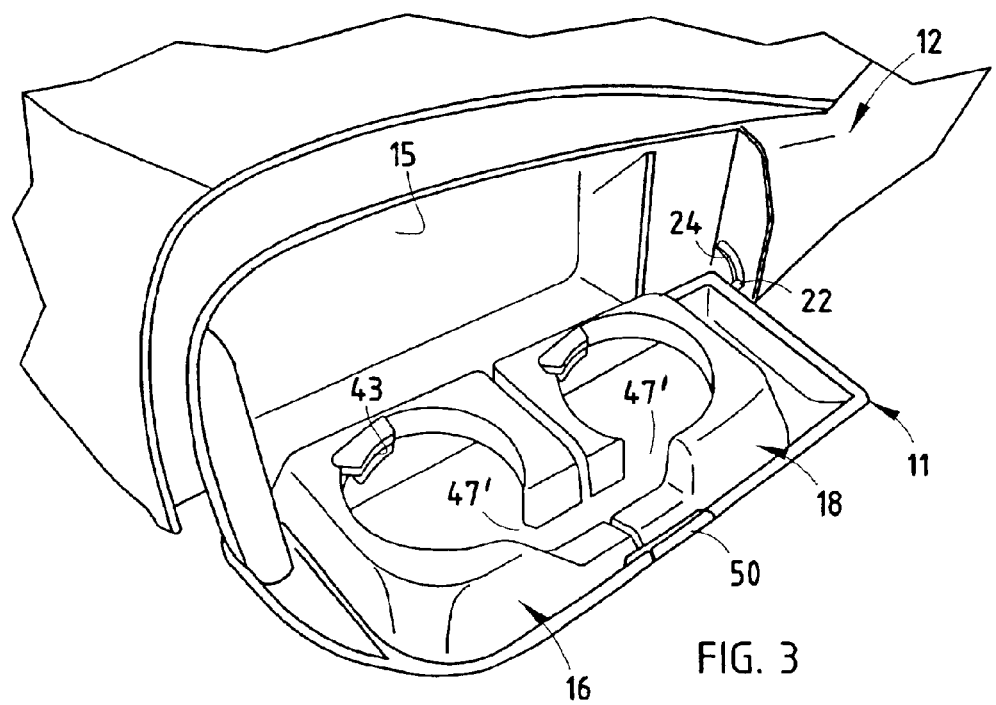
FIG. 3 is a frontal fragmentary perspective view of the present invention.

FIGS. 1–3 show a vehicle accessory 10 which is a combined flexible container holder and tray. The tray 13 is integrally formed as the inside of a pivot down cover 11 pivotally mounted to a housing 12 conventionally secured, in one embodiment, to the side of the seat 14 of a vehicle, such as a van, automobile, sports utility vehicle, or truck. On the inside of the cover 11 there are pivotally mounted a first container holder 16 and a second container holder 18 which, as seen in FIGS. 4–11 of the alternative embodiment, can be individually and independently moved to selected positions to hold a variety of items, as specifically shown in FIGS. 8–11. Thus, either one of container holders 16 and 18 can be individually raised or lowered to change the configuration of the resultant storage tray/container holder(s). The cover 11 defines a tray with a floor 13 and a peripheral rim 13'.

The cover 11, as seen in FIG. 2, includes a pivot pin 20 mounted on each corner, which also includes a tab 22 on each end projecting within an arcuate slot 24 in side walls 27 of housing 12. An aperture 21 on each side wall 27 receives pivot pins 20. A polymeric torque control 28, generally of the type disclosed in U.S. Pat. No. 4,882,807, is interposed between members 20, 22 and 21, 24 for controlling the motion of the cover 11 between closed and open positions. A conventional rotary damper could also be employed for such purpose. A spring-loaded latch 50 holds the cover/tray 11 in a closed position in which it is generally vertical and encloses the recess 15 of housing 12. A detent spring 23 secured on each side of the cover 11 engages the associated tab 22 on each side to provide a detent at the horizontal use position as shown in FIGS. 8–11. Upon application of an overload, as for example, stepping on the tray when in an open position, detent springs 23 will allow the cover/tray 10 to breakaway, preventing damage to the tray, which can then be returned to a normal use or closed position.

The container holders 16 and 18 are pivotally mounted to spaced-apart pivot mounting bosses 30 (FIG. 2), projecting upwardly in appropriately spaced locations on the inside of cover/tray 11. Container holders 16 and 18 each includes a tab 17, 19, respectively, which releasably engages the inner, somewhat flexible lip 11' of cover/tray 11 for holding the container holders to the cover as it is moved from a closed to an open position, as seen in FIG. 1. Upon pivoting upwardly as shown, for example, in FIGS. 5–7, the tabs 17 and 19 on individual container holders 16 and 18, respectively, engage spring-loaded catches (not shown) on the inside of the top wall of housing 12 to selectively retain the container holders within the housing when the cover/tray 11 is open.

The container holders 16 and 18 are each defined by an upper housing 40 and lower plate 42 ultrasonically welded or otherwise secured thereto. Each includes a cylindrical recess 41 for receiving a container therein. A spring-loaded arm 43 is pivotally mounted between members 40 and 42 and is biased inwardly toward the center of aperture 41 by spring 45 to accommodate different sized containers within aperture 41 of each of the holders. Thus, arms 43 engage the cylindrical side wall of different diameter containers to hold them in a stable position in aperture 41. Further, housings 40 include either an open slot 47 or a notch 47' (FIG. 1) to accommodate handles of mugs which may be stored within apertures 41 of container holders 16 and 18.

Housing 12 may include a lower section 60, as seen in FIG. 1, which includes a storage pocket 62 therein partially enclosed by a flexible net 64 to allow items such as maps, books and the like to be placed within the storage bin 62 when cover 11 is in a closed position having its outer surface 14' (FIG. 1) substantially flush with the outer surface 12' of the upper section of housing 12. Although FIGS. 1–3 show a first embodiment of container holders 16 and 18, the independent operation of these container holders and the cover/tray 11 is illustrated also in the embodiments shown in FIGS. 4–11, which are substantially the same as the first embodiment with the exception of the specific shape of the container holders themselves.

Housing 12 can be mounted in a variety of other locations in the vehicle, such as a door panel, the side of a console or armrest, the back of a seat, or any other location where a pivot down cover tray/container holder assembly conveniently places items for access by an operator or passenger. The inside floor surface 13 of cover 10 defines a support tray, therefore, which, depending on the position of container holders 16 and 18, can be expanded, constricted, and reconfigured, although the area 13 (to the right in FIG. 1) preferably always remains available for use.

The embodiment shown in FIGS. 4–11 illustrates the operation of the first embodiment shown in FIGS. 1–3, with the exception that container holders 16 and 18 are somewhat modified. In these figures, container holders 70 and 80 are individually pivotally mounted to the cover 11 by the use of a single pivot rod 75 (FIGS. 5 and 6) which extends between end bosses 76 in the cover 11 through apertures in mounting bosses 72 and 82 in each of the container holders 70 and 80, respectively. Cover 11 is otherwise identical to cover 11 in the first embodiment and is identically mounted to housing 14 as in the first embodiment. The container holders comprise a base plate 71 and 81 with an upwardly extending cylindrical collar 73 and 83 having a notch 77, 87 therein to accommodate a mug handle. The container holders 70 and 80 each further include a resilient polymeric member 78 and 88, respectively, at the top edge which is flexible to grip and hold different sized containers within the cylindrical apertures 71', 81' defined by the cupholders 70 and 80, respectively.

Figure 4:
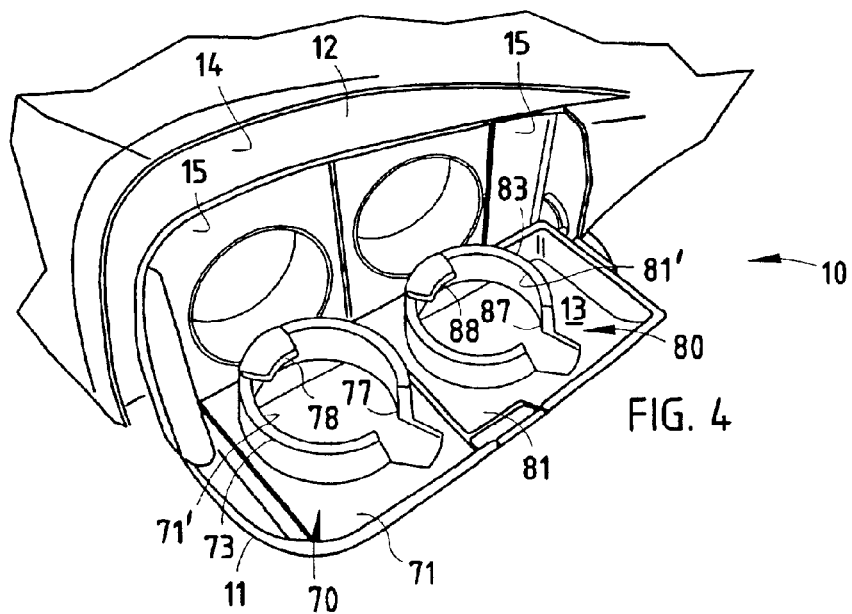
FIG. 4 is a fragmentary perspective view showing a second embodiment of the present invention in a first operative position.
Figure 6:
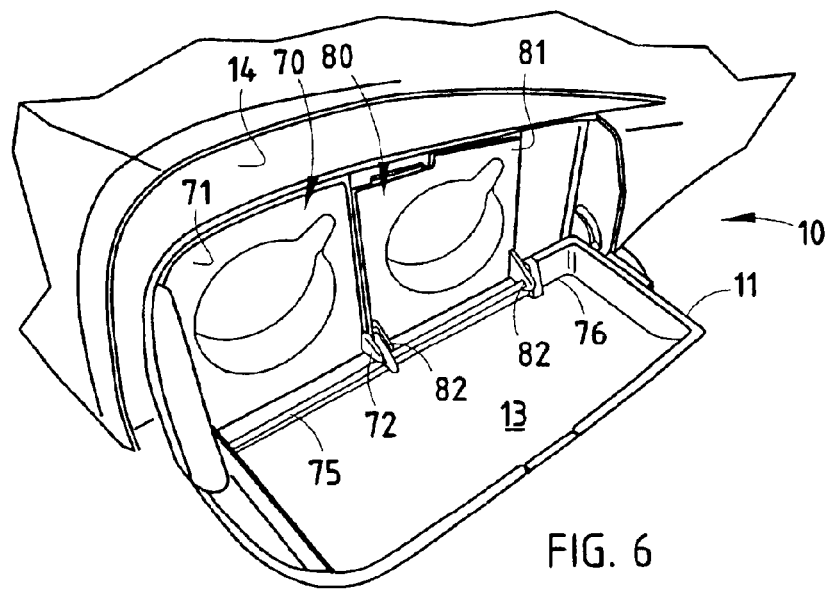
FIG. 6 is a fragmentary perspective view showing the second embodiment of the present invention in a third operative position.
Figure 8:
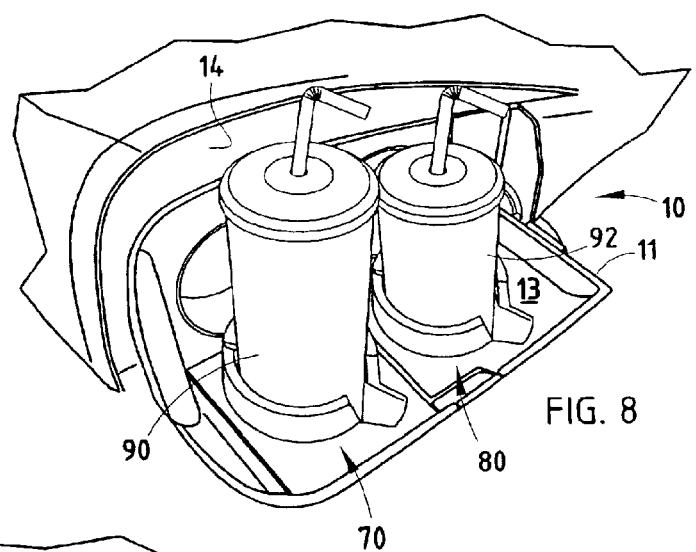
FIG. 8 is a fragmentary perspective view showing the second embodiment of the present invention in the first operative position, showing various containers held therein.
Figure 10:
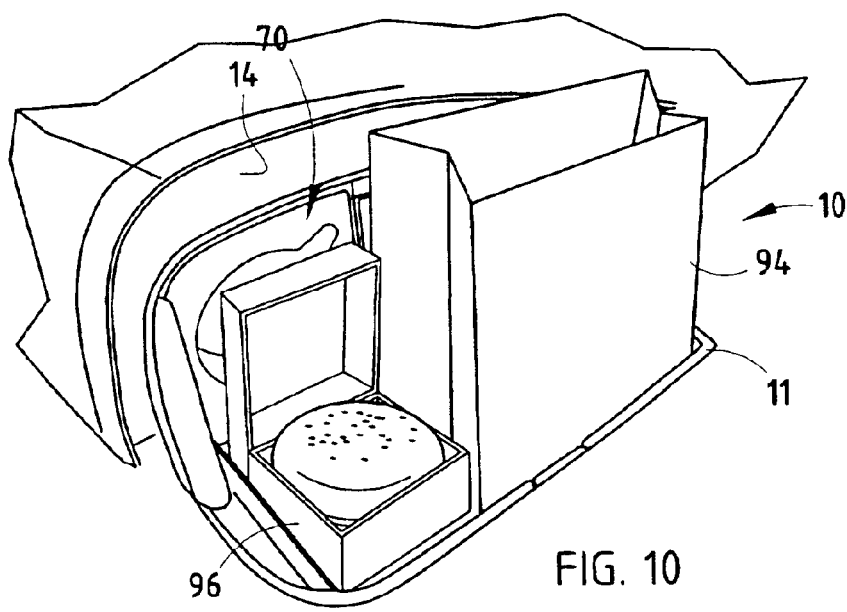
FIG. 10 is a fragmentary perspective view showing the second embodiment of the present invention in the third operative position, showing various objects held therein.

When the container holders are both lowered to a use position as shown in FIGS. 3 and 4, various sized containers can be placed therein such as drink cups 90 and 92 as seen in FIG. 8. FIG. 6 shows the combined tray/container holder in yet another configuration with both container holders 16 and 80 or 18 and 70 in a raised position to provide maximum tray surface area 13 for storage of flat objects, as shown in FIG. 10, such as a food or storage bag 94 and a sandwich container 96.

Figure 7:
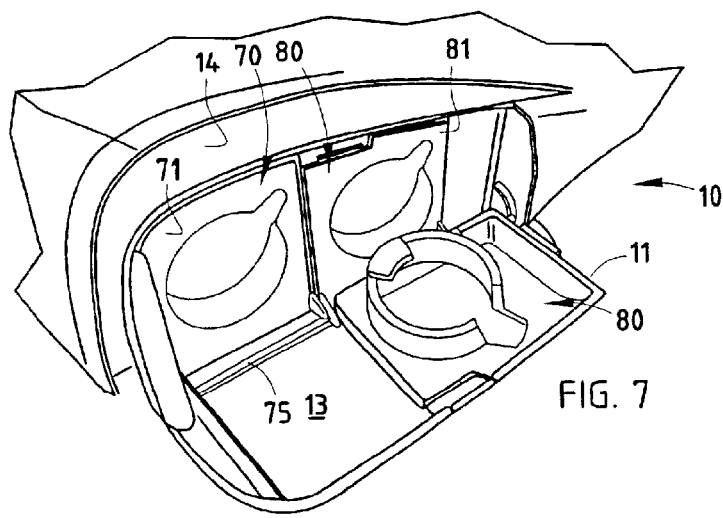
FIG. 7 is a fragmentary perspective view showing the second embodiment of the present invention in a fourth operative position.
Figure 11:
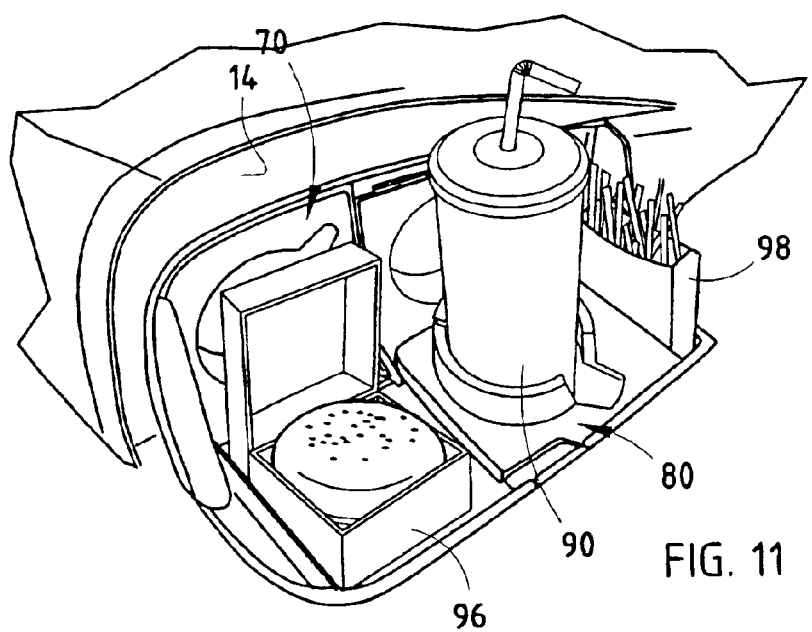
FIG. 11 is a fragmentary perspective view showing the second embodiment of the present invention in the fourth operative position, showing a container and various objects held therein.

In yet another configuration, a seen in FIG. 7, the container holder 70 (or 16) is raised to a storage position while container holder 80 (or 18) is lowered for use to accommodate, as seen in FIG. 11, a sandwich container 96 in the floor area 13 exposed by the storage of container holders 16 and 70, a drink cup 90 and a French fry container 98 in the right-most storage area 13 (FIGS. 1–4), as illustrated in FIG. 11.

Figure 5:
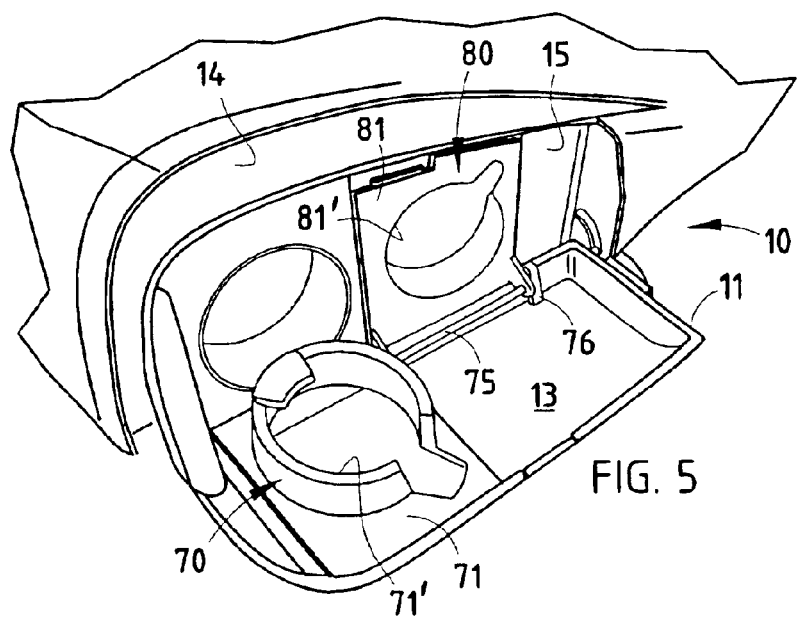
FIG. 5 is a fragmentary perspective view showing the second embodiment of the present invention in a second operative position.
Figure 9:
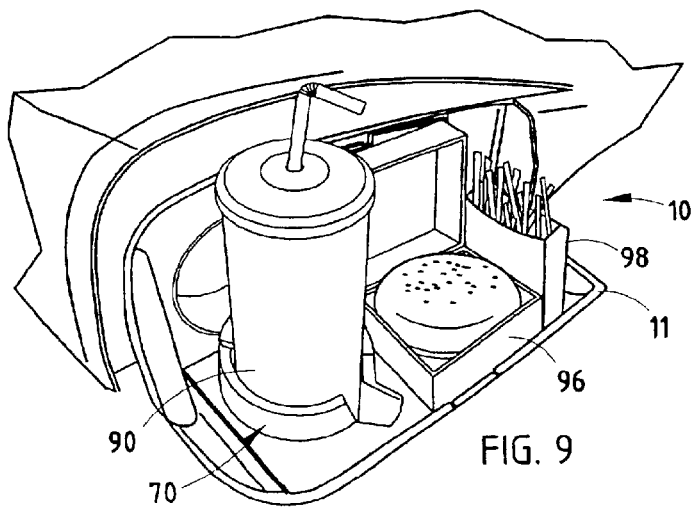
FIG. 9 is a fragmentary perspective view showing the second embodiment of the present invention in the second operative position, showing a container and various objects held therein.

When in the position shown in FIG. 5, the tray/container holder 10, with container holders 16 or 70 in the lowered position, the system accommodates a drink cup 90 at one end and, with container holder 18 or 80 in the raised position, a sandwich container 96 and a French fry container 98, as seen in FIG. 9.

In each of the embodiments, with the cover 11 in a lowered use position as shown in FIGS. 1, 3, and 4, both of the container holders 16 and 18 or 70 and 80 can be in a lowered position for storing two containers therein. In the embodiment shown in FIGS. 4–11, the recess 15 of housing 12 includes cylindrical recesses for receiving the collar 73 and 83 of container holders 70 and 80, respectively.

FIG. 12 shows an alternative embodiment of the invention in which a combined tray and storage slot 100 is provided. A housing 112 includes a storage recess 115 therein and a cover 111 is pivotally mounted to the side walls 127 of recess 115 in the same manner as in the first embodiment by the use of pivot pins 120 and 122 and recess 124 in side walls 127 utilizing a detent spring 123 providing break-away action of the cover 111 as in the earlier embodiments. The cover includes a floor 130 mounted in spaced relationship to the inner surface 112 of cover 111 to define a pocket 125 between floor 130 and inner surface 112 of cover 111 such that the pocket 125 can accommodate maps or other relatively small objects therein. A spring release catch 150 secures the cover to a closed position within housing 112 when not in use. When pivoted outwardly to a horizontal use position (such as shown in the alternative embodiments in FIGS. 1 and 3), floor 130 provides a flat storage surface for receiving items such as food storage containers or the like. Floor 130 may also include cylindrical apertures 131 (shown in phantom in FIG. 12) for receiving containers.

In yet another embodiment of the invention shown in FIG. 13, a molded polymeric housing 212 includes a top wall 230, a bottom wall 232, side wall 213, front wall 234, and rear wall 236. Side wall 213 has a rectangular opening 214 for access to storage area 215 therein. A resilient net 217 (shown broken away) selectively encloses a lower section of opening 214 and has its ends 218 secured to the inner surface of wall 213. At the left end 234 (as seen in FIG. 13), polymeric housing 212 includes a integrally formed door 220 which is pivotally attached to housing 212 with an integral polymeric coextruded hinge such that items can be reached through the access opening 225 defined by door 220 or through opening 214. Door 220 includes an integral snap-closed latch (not shown) which cooperates with housing 212 to maintain the door closed. In each of the embodiments, the housings, container holders, and covers are integrally molded of a suitable polymeric material, such as PVC, which is colored and textured to conform to the vehicle's interior.

It will become apparent to those skilled in the art that various modifications to the preferred embodiment of the invention as described herein can be made without departing from the spirit or scope of the invention as defined by the appended claims.

The invention claimed is:

1. A container holder/tray combination comprising:

a housing for mounting to a vehicle, the housing defining a recess for receiving therein at least one container holder;

a cover pivotally mounted to said housing for covering said container holder and housing recess when in a closed position, and movable to an open position, said cover having a surface defining a tray; and a container holder pivotally mounted with respect to said tray between a first position coplanar with said tray for positioning a container therein and a storage position within said housing, such that when said cupholder is in said storage position, said surface defining a tray is exposed for the support of items on said tray.

2. The combination as defined in claim 1 wherein said surface defining a tray includes an area adjacent said container holder when said container holder is in said first position serving as a support surface for supporting items on said adjacent area.

3. A container holder/tray combination comprising:

a housing for mounting to a vehicle, the housing defining a recess for receiving therein a pair of container holders;

a cover pivotally mounted to said housing for covering said container holder and housing recess when in a closed position, and movable to an open position, said cover having a surface defining a tray; and a pair of container holders pivotally mounted to said tray in adjacent relationship to one another and independently movable between stored and use positions, wherein said container holders are movably positioned with respect to said housing and said tray between a first position overlying said tray for positioning a container therein and a storage position within said housing.

4. The combination as defined in claim 3 wherein said cover includes a detent extending between said cover and housing for holding the cover in the open position and allowing the cover to breakaway to a second position pivoted further from the housing.

5. The combination as defined in claim 4 wherein each of said container holders are independently movable between positions within said cover and positions within said housing when said cover is in an open position.

6. The combination as defined in claim 5 and further including latches for releasably holding each container holder in one of said housing and said cover.

7. The combination as defined in claim 6 wherein said latches include a resilient tab on an edge of the container holder.

8. The combination as defined in claim 7 and further including a latch on said cover which cooperates with said housing for holding said cover in a closed position.

9. A container holder/tray combination comprising:

a housing for mounting to a vehicle, the housing defining a recess for receiving therein at least one container holder;

a cover pivotally mounted to said housing for covering said container holder and housing recess when in a closed position, and movable to an open position, said cover having a surface defining a tray; and a container holder movably positioned with respect to said housing and said tray between a first position overlying said tray for positioning a container therein and a storage position within said housing, wherein said housing includes an open storage compartment located under said cover.

10. The combination as defined in claim 9 wherein said open storage compartment is selectively enclosed by a net.

11. A container holder/tray combination comprising:

a housing adapted to be mounted within a vehicle, said housing defining a storage recess having an open side;

a cover pivotally mounted to said housing for selectively covering said open side and movable between a closed position and an open position, said cover having a surface defining a tray when in said open position; and a plurality of container holders independently movably mounted to one of said housing and tray and movable between a first position coplanar with said tray for receiving a container therein and a second position within said storage recess.

12. The combination as defined in claim 11 wherein said tray includes an exposed area adjacent one of said container holders serving as a support surface for supporting items therein.

13. The combination as defined in claim 12 wherein said cover includes a detent extending between said cover and said housing for holding said cover in said open position and allowing the cover to breakaway to a second position pivoted further from the housing upon application of an excessive force.

14. The combination as defined in claim 13 and further including a latch for each container holder for releasably holding each container holder in one of said housing and cover.

15. The combination as defined in claim 14 wherein each of said latches includes a tab on an edge of an associated container holder.

* * * * *